United States Patent
Höfig

(10) Patent No.: US 9,483,342 B2
(45) Date of Patent: Nov. 1, 2016

(54) SUPPORTING FAILURE MODE AND EFFECTS ANALYSIS

(71) Applicant: Kai Höfig, München (DE)

(72) Inventor: Kai Höfig, München (DE)

(73) Assignee: Siemens Aktiengesellschaft, München (DE)

(*) Notice: Subject to any disclaimer, the term of this patent is extended or adjusted under 35 U.S.C. 154(b) by 95 days.

(21) Appl. No.: 14/256,673

(22) Filed: Apr. 18, 2014

(65) Prior Publication Data

US 2015/0269013 A1    Sep. 24, 2015

(30) Foreign Application Priority Data

Mar. 20, 2014 (EP) ..................... 14160897

(51) Int. Cl.
  *G06F 11/07* (2006.01)
  *G06Q 10/04* (2012.01)
  *G06Q 10/10* (2012.01)

(52) U.S. Cl.
  CPC ............. *G06F 11/079* (2013.01); *G06Q 10/04* (2013.01); *G06Q 10/101* (2013.01)

(58) Field of Classification Search
  CPC .... G06F 11/079; H04L 41/12; H04L 41/509; H04L 47/70; H04L 67/06; H04L 67/10
  See application file for complete search history.

(56) References Cited

U.S. PATENT DOCUMENTS 8,347,146 B2 * 1/2013 Bell ...................... G06F 11/008
703/16

FOREIGN PATENT DOCUMENTS

WO    WO2009077776 A2    6/2009

OTHER PUBLICATIONS

Exida, "Failure Modes, Effects and Diagnostic Analysis", May 4, 2007, pp. 1-20, available online on Mar. 30, 2014 at http://www2.emersonprocess.com/siteadmincenter/PM%20Rosemount%20Documents/8732E_V11_FMEDA.pdf.
Mikos W. L. et al: A system for distributed sharing and reuse of design and manufacturing knowledge in the PFMEA domain using a description logics-based ontology; Journal of Manufacturing Systems, Society of Manufacturing Engineers; Dearborn; MI, US; vol. 30; No. 3, pp. 133-143; XP028286742,ISSN: 0278-6125, DOI 10.1016/J.JMSY.2011.06.001; Jun. 27, 2011.
Molhanec M.: Model based FMEA method for solar modules; Procedings of the 36th International Spring Seminar on Electronics Technology; IEEE; pp. 183-188; XP032517444; ISSN: 2161-2528, DOI: 10.1109/ISSE.2013.6648239; May 8, 2013.
PCT International Search Report and Written Opinion of the International Searching Authority dated May 6, 2015 for corresponding PCT/EP2015/051756.
Teoh P.C. et al: Failure modes and effects analysis through knowledge modeling; Journal of materials processing Technology; Elsevier, NL, vol. 153-154; pp. 253-260; XP027526933; ISSN: 0924-0136; Nov. 10, 2004.

\* cited by examiner

*Primary Examiner* — Nadeem Iqbal
(74) *Attorney, Agent, or Firm* — Lempia Summerfield Katz LLC

(57) ABSTRACT

A method for supporting failure mode and effects analysis includes storing a meta-model in a computer-readable storage medium. The meta-model includes generic parts of technical systems, generic failure modes, and associations between the generic parts and the generic failure modes. The associations indicate, for each generic part, one or more generic failure modes associated with the generic part. Each generic failure mode identifies a type of failure for a respective generic part. A processor instantiates the generic parts and the generic failure modes to generate part instances and failure mode instances specifying a technical system. The part instances and the failure mode instances are stored, such as in the computer-readable storage medium.

21 Claims, 4 Drawing Sheets

FIG 1

| | FIG 1A | FIG 1B |
|---|---|---|

FIG 1A

| Nr. | Type | Part | Circuit ID | Function | λ | Failure Mode | Effect | % |
|---|---|---|---|---|---|---|---|---|
| | C1 | C2 | C3 | C4 | C5 | C6 | C7 | C8 |
| 1 | Capacitor | 10nF/120V | C101 | smooth output | 10,00 | short circuit | amplification factor exceeds | 50% |
| | | | | | 10,00 | open circuit | limitations | 50% |
| | | | | | 10,00 | Copy this line | no effect | 0% |
| | | | | | 0,00 | Do not copy this line | | 100% |
| 2 | Resistor | 10kOhm | R305 | regulates amplification factor | 20,00 | short circuit | no effect | 50% |
| | | | | | 20,00 | open circuit | amplification factor exceeds | 50% |
| | | | | | 20,00 | Copy this line | limitations | 0% |
| | | | | | 0,00 | Do not copy this line | | 100% |

FIG 1B

| C10 | C11 | C12 | C13 | C14 | C15 | C16 | C17 | C18 | C19 |
|---|---|---|---|---|---|---|---|---|---|
| safe | dang | * | $\lambda s$ | $\lambda d$ | $\lambda *$ | Diagnosis | DCcomp | $\lambda du$ | $\lambda dd$ |
| 0 | 1 | 0 | 0,000 | 5,000 | 0,000 |  | 90,0 | 0,50 | 4,50 |
| 0 | 0 | 1 | 0,000 | 0,000 | 5,000 | Pulsed test will detect this failure | 0,0 | 0,00 | 0,00 |
| 0 | 1 | 0 | 0,000 | 0,000 | 0,000 |  | 0,0 | 0,00 | 0,00 |
| 0 | 0 | 1 | 0,000 | 0,000 | 10,000 |  | 0,0 | 0,00 | 0,00 |
| 0 | 1 | 0 | 0,000 | 10,000 | 0,000 | Pulsed test will detect this failure | 90,0 | 1,00 | 9,00 |
| 0 | 1 | 0 | 0,000 | 0,000 | 0,000 |  | 0,0 | 0,00 | 0,00 |

SUPPORTING FAILURE MODE AND EFFECTS ANALYSIS

This application claims the benefit of EP 14160897.6, filed on Mar. 20, 2014, which is hereby incorporated by reference in its entirety.

BACKGROUND

Failure Mode and Effects Analysis (FMEA or FMEA analysis) examines the consequences of potential failures on the functionality of a technical system. Various FMEA analyses are used in domains to analyze safety critical systems.

Failure mode and effects analysis is an inductive reasoning (e.g., forward logic) single point of failure analysis for safety critical systems. Failure mode and effects analysis are available in different variations for different applications, such as software or processes. Failure mode and effects analysis may be either qualitative or quantitative. The variations analyze failure modes of elements and the effects of the failure modes on the analyzed system. A generic quantified FMEA is described for a domain independent application of electrical/electronic/programmable electronic systems in "Failure Modes, Effects and Diagnostic Analysis," available at http://www2.emersonprocess.com/siteadmincenter/PM%20Rosemount%20Documents/8732E_V11_FMEDA.pdf (Mar. 30, 2014). Without the quantifications, the FMEA described therein is also generic for the qualitative variation of the analysis. The variation of FMEA described therein is referred to as a Failure Mode Effects and Diagnostic Analysis, or Failure Mode Effects and Diagnostic Coverage Analysis (FMEDA).

A FMEA (or FMEDA) as described in the above-referenced publication is typically developed using a manually maintained table with the support of a spreadsheet processing computer system. FIGS. 1A and 1B collectively show an example of a table from such a system. In column C1 of the table, the analyzed parts are numerated. Parts may be components or electronic devices. In column C2, the type of the analyzed part is indicated, e.g., a capacitor or resistor. In column C3, the electronic type of the part is indicated, e.g., the capacitor is a 10 nF/120V capacitor. In column C4, the identifier is used to identify the part in the specific system is indicated, such as an identification number of the electric circuit plan, e.g., C101 for the capacitor. In column C5, the function of the part is textually described. In column C6, the failure rate lambda is indicated, e.g., 10FIT (failure in time, $1*10^{-9}$ per hour) for the capacitor. Column C7 presents the failure modes of the part, such as two metal connectors of the capacitor may either short circuit or be damaged and in an open circuit state. Column C8 is used to describe a failure effect that corresponds with a failure mode. For example, if the capacitor is in an open circuit state, the failure has no consequences. Column C9 is used to allocate (e.g., split) the failure rate lambda (as indicated in column C6) to the individual failure modes. For example, the failure rate of 10FIT of the capacitor is equally split for the two failure modes of the capacitor. Columns C10 to C12 are used to categorize the failure effect into the categories "safe", "dangerous", and "disregard" (or "don't care"). Columns C13 to C15 calculate the residual failure rate for the specific failure effect and category (safe $\lambda_s$, dangerous $\lambda_d$, and disregard $\lambda_*$). For example, the failure rate $\lambda_d$ for the failure mode "short circuit" is 5FIT since $$10FIT(\text{column } C6)*50\%(\text{column } C9)*1(\text{column } C11)=5FIT$$

The other columns are calculated accordingly. Column C16 is used to describe a possible diagnostic measure capable of detecting or mitigating a dangerous failure effect. For example, the failure effect corresponding to the failure mode "short circuit" of the capacitor is detected by a pulsed test signal. Column C17 indicates the effectiveness of that measure. For example, the pulsed signals that detect the dangerous failure effect of the open circuit failure mode of the capacitor may only detect or mitigate a fraction of 90% of the occurrences of that failure effect. Column C18 is used to calculate the residual failure rate that a dangerous failure effect goes undetected ($\lambda_d$ undetected, or $\lambda_{du}$). Column C19 is used to calculate the failure rate for the case that the dangerous failure effect is detected by the diagnostic measure ($\lambda_d$ detected, or $\lambda_{dd}$).

The manually maintained table of FIG. 1 may contain automation, such as when implemented in a spreadsheet application. The automation may calculate the values for the different failure rates or completeness of the percentages.

Because modern safety critical systems tend to increase complexity, automations and tool support have a long history in research and industry. Whereas compact embedded systems may be analyzed using FMEA in a manually maintained table, more complex systems may result in an unmanageably long table, such as when larger development teams are involved.

SUMMARY AND DESCRIPTION

The scope of the present invention is defined solely by the appended claims and is not affected to any degree by the statements within this summary.

The present embodiments may obviate one or more of the drawbacks or limitations in the related art. For example, the present embodiments may provide a meta-model as a framework for reusable FMEA analyses, thereby avoiding inconsistencies of failure effects and/or inconsistencies of failure modes.

Inconsistencies of failure modes may arise from one part being used multiple times in a system, e.g., in electronic circuits where very large circuits are built using a small number of electronic devices. In electronic circuits, these parts are used repeatedly. Each instance (or implementation) of a part is expected to result in the same failure modes in a FMEA. By providing a meta-model with generic parts and failure modes that are instantiated to generate (e.g., create) part instances and failure mode instances, error-prone manual data entry in tables and the resulting inconsistencies may be largely avoided. As a result, consistency of the failure modes may be provided (e.g., guaranteed) even when analyzing larger technical systems.

One embodiment of a method for supporting failure mode and effects analysis includes storing a meta-model in a non-transitory computer-readable storage medium. The meta-model includes generic parts of technical systems, generic failure modes, and associations between the generic parts and the generic failure modes. The associations indicate for each generic part one or more generic failure modes that the generic part is associated with. Each generic failure mode describes a type (or kind) of failure that a generic part may have. The method includes instantiating with a processor the generic parts and the generic failure modes to create part instances and failure mode instances specifying (e.g., describing) a distinct (e.g., specific) technical system. The method also includes storing the part instances and failure mode instances, e.g., in a computer-readable storage medium, such as the computer-readable storage medium in which the meta-model is stored.

In one embodiment, a system for supporting failure mode and effects analysis includes a digital data storage medium that stores a meta-model. The meta-model includes generic parts of technical systems, generic failure modes, and associations between the generic parts and the generic failure modes. The associations indicate for each generic part one or more generic failure modes that the generic part is associated with. Each generic failure mode describes a type (or kind) of failure that a generic part may have. The system also includes a microprocessor programmed (e.g., configured) to instantiate the generic parts and generic failure modes to create part instances and failure mode instances describing a specific technical system. The microprocessor is programmed to store the part instances and failure mode instances in a computer-readable storage medium.

In one embodiment, a meta-model is stored in a non-transitory computer-readable storage medium. The meta-model includes generic parts of technical systems, generic failure modes, and associations between the generic parts and the generic failure modes. The associations indicate for each generic part one or more generic failure modes that the generic part is associated with. Each generic failure mode describes a type (or kind) of failure that a generic part may have. Furthermore, a computer program is stored in the non-transitory computer-readable storage medium and has instructions for supporting failure mode and effects analysis when executed by one or more processors (e.g., microprocessors). The instructions include instantiating the generic parts and generic failure modes to create part instances and failure mode instances describing a specific technical system. The instructions include storing the part instances and failure mode instances in a computer-readable storage medium.

In accordance with an embodiment of the method, instantiating includes (or may be implemented by) constructing the part instances and failure mode instances as objects from classes representing the generic parts and generic failure modes. Alternatively, instantiating includes (or may be implemented by) creating the part instances and failure mode instances as database entries from database content describing the generic parts and generic failure modes. Object oriented programming and/or database programming may thus be used. In a corresponding embodiment of the system, the processor is further configured to perform the aforementioned acts.

In accordance with another embodiment of the method, the method includes associating each failure mode instance with a part instance based on the associations between the generic failure modes and the generic parts stored in the meta-model. Most part instances are associated with more than one failure mode instance. The method further includes quantifying a failure behavior for each part instance, and storing a percentage in each failure mode instance. The percentage indicates how much of the quantified failure behavior of the part instance associated with the failure mode instance corresponds to the failure mode instance. This embodiment provides a valuable basis for FMEA. In a corresponding embodiment of the system, the processor is further configured to perform the aforementioned acts.

In accordance with a further embodiment of the method, the method includes adding a new generic failure mode and an association of the new generic failure mode to a corresponding generic part to the meta-model, and automatically instantiating with the processor the new generic failure mode to create new failure mode instances and associations to all part instances that have been previously instantiated from the corresponding generic part. In a corresponding embodiment of the system, the processor is further configured to perform the aforementioned acts.

This embodiment maintains the consistency of the meta-model. If a new failure mode is discovered during the design of the specific technical system, then this embodiment provides a useful way to expand the FMEA in a consistent manner in order to encompass the new failure mode. By adding a new generic failure mode and an association of the new generic failure mode to a corresponding generic part in the meta-model, new failure mode instances for the corresponding part instances may be automatically and consistently created. Error-prone and time-consuming manual data entry in tables and the resulting inconsistencies may be largely avoided.

In accordance with another embodiment of the method, the method includes creating effect elements and associating each effect element with one or more failure mode instances, and storing information about the effect of the associated failure mode instances on the specific technical system in each effect element. In a corresponding embodiment of the system, the processor is further configured to perform the aforementioned acts.

This embodiment provides a valuable basis for FMEA. Using the effect elements prevents inconsistencies of failure effects in the FMEA, because not more than one effect element is associated with each failure effect. That effect element is then reused and associated with all failure mode instances that cause the particular failure effect. Error-prone and time-consuming manual data entry in tables and the resulting inconsistencies may be largely avoided. By preventing inconsistencies, failure modes that result in the same failure effect may be identified, e.g., for diagnostic purposes. The occurrence rate of a specific failure effect (e.g. "no output") may be analyzed because all of the occurrences of the failure effect are represented by the same effect element. As a consequence, this failure effect may be quantified.

In accordance with a further embodiment of the method, the method includes storing in each effect element a safety categorization of the effect element. In a corresponding embodiment of the system, the processor is further configured to perform the aforementioned act.

In accordance with another embodiment of the method, the method includes logging events during operation of the specific technical system, storing recorded effects based on the logged events, associating each recorded effect with an effect element, and monitoring, based on the frequency of the recorded effects, actual failure rates of the part instances and/or failure mode instances that are associated with the effect element. In a corresponding embodiment of the system, the processor is further configured to perform the aforementioned acts.

According to this embodiment and as a result of the high consistency of the failure mode instances, the corresponding failure effects of the failure mode instances may be measured against field data. Field data may then be used to identify parts that may cause a failure effect. Due to the consistency of the failure modes, the set of failure modes for each part is complete. Field data may thus be used to identify all parts that may cause the failure effect.

In accordance with a further embodiment of the method, the method includes tracing recorded effects to the corresponding effect elements, failure mode instances and part instances, and identifying part instances that exceed a predetermined (e.g., assumed) failure rate and that might be repaired or replaced in order for the specific technical system to comply with failure rate limitations (e.g., to keep the specific technical system in desired failure rate limitations). In a corresponding embodiment of the system, the processor is further configured to perform the aforementioned acts.

According to this embodiment and due to the consistent definition of effect elements, field data from running systems (e.g., the recorded effects) may be linked to the failure effects in the FMEA (e.g., the effect elements) for diagnostic reasons and to verify failure rates. For example, if, for an implementation of the specific technical system, the failure effect "amplification exceeds limitations" is observed repeatedly as a recorded effect, the FMEA may solve the problem of identifying all possible parts that may cause the failure effect because the corresponding effect element of the failure effect is consistently linked to the corresponding failure mode instances. The corresponding failure mode instances are in turn linked to the corresponding part instances.

In accordance with another embodiment of the method, measure elements corresponding to diagnostic measures are included in the meta-model. Each diagnostic measure is able to detect the occurrence of failure mode instances and to prevent failure effects caused by the respective failure mode instances. Each measure element is associated with failure mode instances the occurrence of which the corresponding diagnostic measure is able to detect. An effectiveness is stored in each measure element. The effectiveness describes the probability that the corresponding diagnostic measure is able to detect the associated failure mode instances. In a corresponding embodiment of the system, the processor is further configured to perform the aforementioned acts.

In accordance with a further embodiment, the generic parts are generic parts of electric vehicles and/or industrial plants. The specific technical system is a specific electric vehicle, a specific industrial plant, a specific subsystem of an electric vehicle, or a specific subsystem of an industrial plant.

BRIEF DESCRIPTION OF THE DRAWINGS

FIGS. 1A and 1B illustrate a manually maintained FMEA (or FMEDA) table;

DETAILED DESCRIPTION

A meta-model is provided and configured to overcome inconsistencies by enabling the reuse of parts, failure modes, and failure effects, and by utilizing the different relations between the parts, failure modes, and failure effects in FMEA analyses. The meta-model is used to document the relevant elements and relations of the relevant elements, thereby providing a methodology based on a reusable FMEA. The meta-model is configured to reflect elements of the FMEA described herein, and also extends the methodology by utilizing the relations of the elements. In this way, the reuse-functionality is enabled and inconsistency problems are solved.

Figure 2:
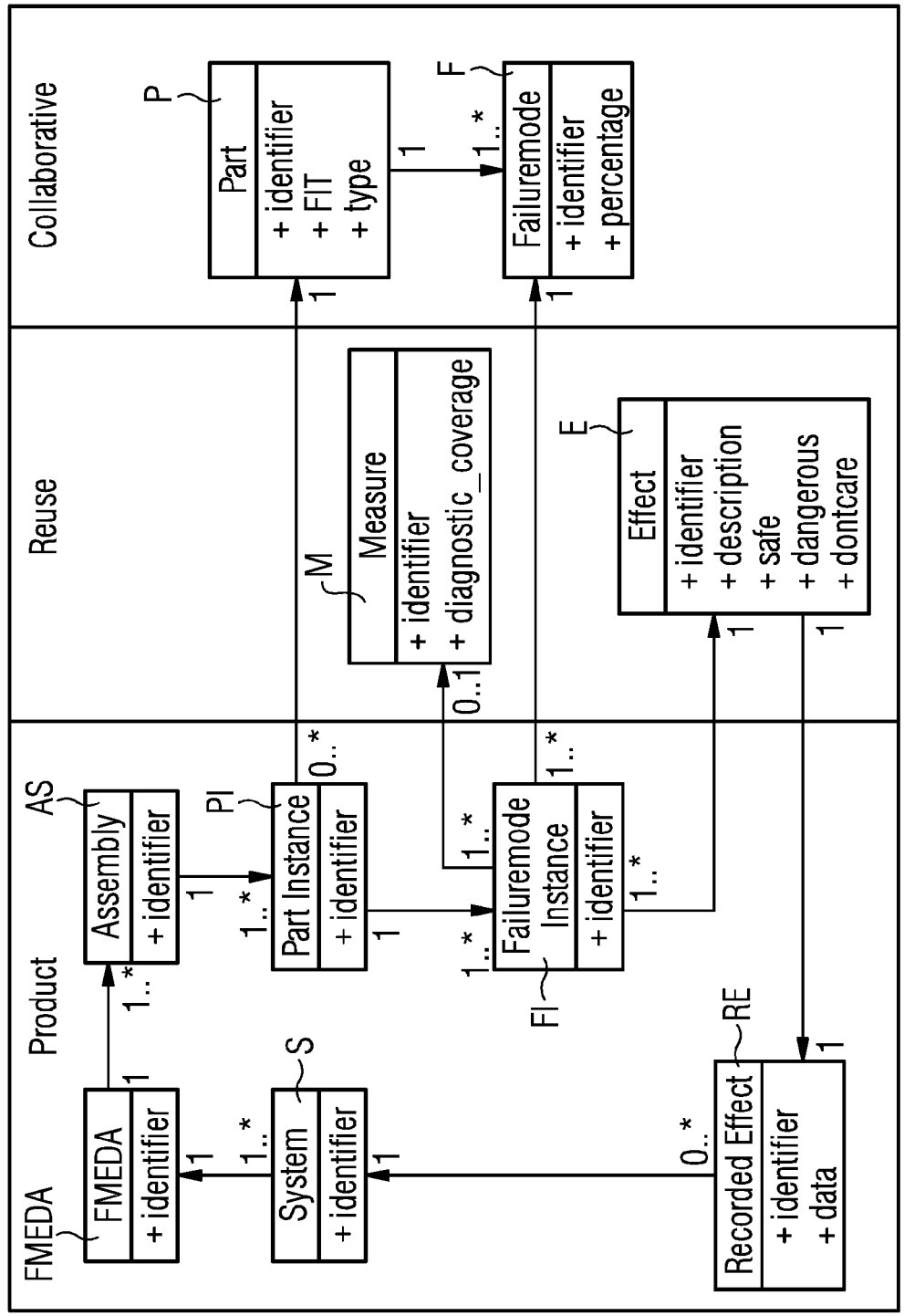
FIG. 2 illustrates a meta-model for FMEA in accordance with one embodiment.

FIG. 2 shows the meta-model for a FMEA analysis FMEDA using generic parts P and generic failure modes F. To break down a larger system S into manageable parts, the FMEA analysis (or FMEDA) includes multiple assemblies AS. Each assembly AS is a set of analyzable elements of the system S that builds a logic unit. Each element of an assembly AS is a part instance PI of a part, referring to a specific electronic device or a specific component. Each part instance PI is related to a generic part P, e.g., stored in a set or list as the generic parts P in the meta-model. The meta-model stores all generic parts P that may be used to build the system S and the assemblies AS of the system. Each generic part P has an associated set of generic failure modes F. A generic failure mode F describes a specific type (e.g., kind) of failure that a generic part P may have. Because a generic part P has a quantified behavior to fail (referred to as a FIT), a generic failure mode F has a percentage to assign a portion of the percentage of the quantified failure behavior of the generic part P to the respective generic failure mode F. The generic parts P and generic failure modes F are data provided by a global data source, such as an ACCESS database or a MySQL database, and are therefore associated with the area identified as "collaborative" in FIG. 2.

The failure mode instances FI are instantiated because, in the analyzed system S, the failure mode instances FI that stem from the generic failure modes F from the collaborative data may have different failure effects in different assemblies AS or systems S. The instantiation is provided in the meta-model by adding an instance, the failure mode instance FI, of a generic failure mode F from the collaborative data. This failure mode instance FI has an associated effect element E holding information, such as a description about the corresponding failure effect (e.g., the effect of the failure mode instance FI on the system S). Within the effect element E, the failure effect is classified and quantified in a category, such as the "safe", "dangerous" and "disregard" categories, to identify (e.g., mark) an effect as not harmful ("safe"), with no effects on the outcome of the analysis ("disregard"), or as harmful ("dangerous"). Furthermore, a failure mode instance FI has an associated measure. The measure is represented by a measure element M. The corresponding measure primarily detects the failure mode instance FI. The measure may also provide protection against occurrence of the failure effect. For example, if a failure mode instance FI is detected during the operation of the analyzed system S, the measure may set the system S into a shutdown state (or safe state) to prevent the failure effect. Because mechanisms detecting failure mode instances FI during the operation of a system S are usually not 100% effective, the measure element M has an associated effectiveness, e.g., a quantified percentage value (or diagnostic coverage). Because effect elements E and measure elements M are re-used in the analysis of a system S, the effect elements E and the measure elements M are identified in (or associated with) a reuse area of the diagram.

The FMEA analysis (or FMEDA) analytically covers all instances of the system S (e.g., products) in the real world. To support diagnosis, effects of failure modes of parts of the real world systems are recorded as recorded effects RE. Each system S may have various failure modes and therefore various recorded effects RE during operation of the system S. The recorded effects RE are associated with the effect elements E in order to monitor the actual failure rates during the operation of the system S.

The directions of the associations are shown via arrows in FIG. 2. The directions document a correlation. However, the direction of the arrows is only conceptual. The implementation of the meta-model, e.g., in a database structure, is bidirectional. The quantifications connected to the associations (the arrows) in FIG. 2 are also exemplary and may vary for different domains or different types of FMEA. For example, the association between the recorded effects RE and the system S establishes (e.g., documents) that a recorded effect RE is affiliated with (e.g., belongs to) the system S and that every recorded effect RE is affiliated with (e.g., belongs to) a single system S but that every system S may have zero or any arbitrary number (0 . . . *) of recorded effects RE.

The application of the meta-model of FIG. 2 is described in the following section using an example system.

Figure 3:
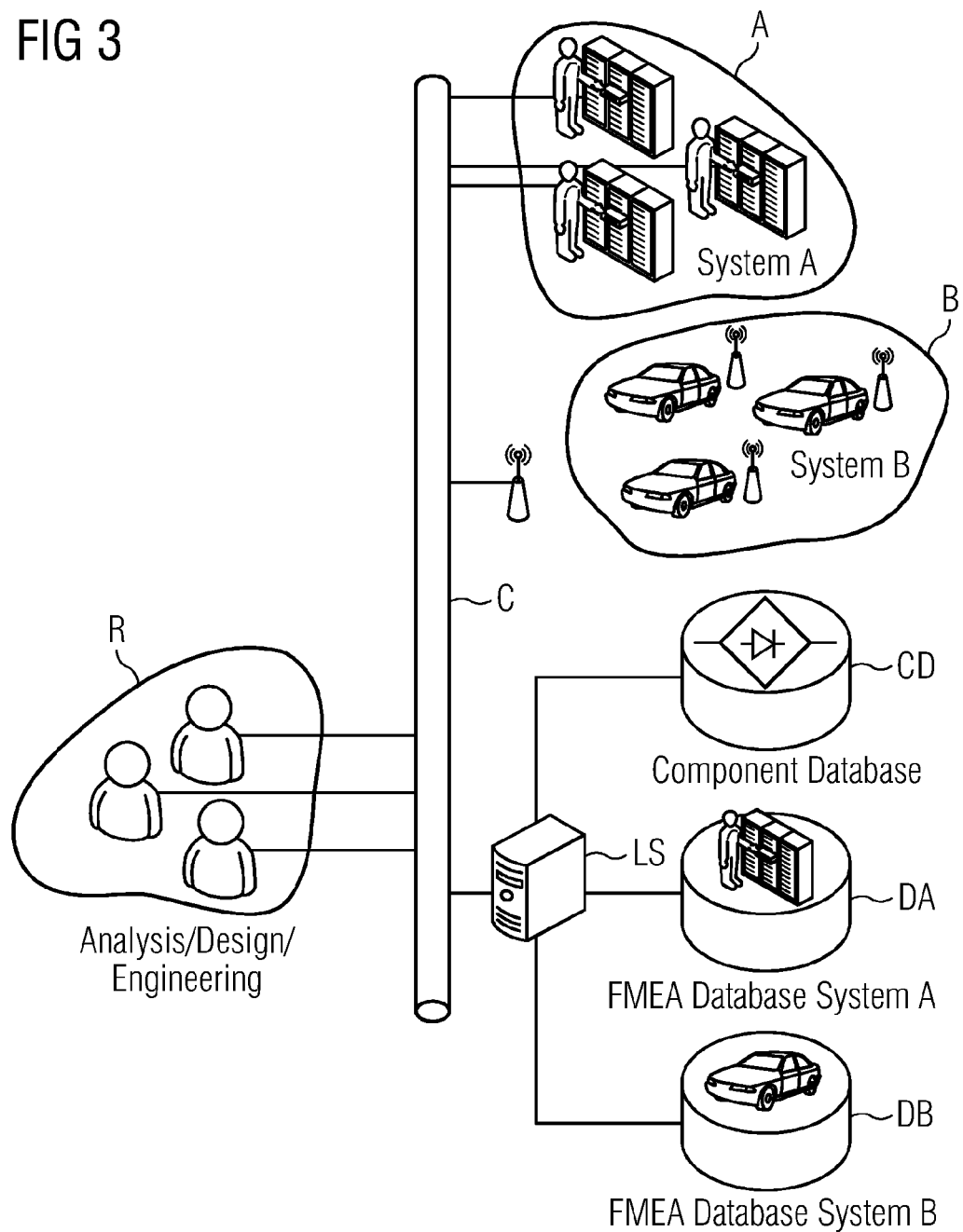
FIG. 3 illustrates an exemplary implementation of the effect logging mechanisms, reuse of failure modes, and FMEA database.

FIG. 3 shows an exemplary implementation of the meta-model shown in FIG. 2. Generic failure modes and generic parts that may be used to build systems are stored within a component database CD. The roles R that analyze the systems, such as a team of analysts, designers, and engineers, use the component database CD to generate (e.g., create) an FMEA analysis of a specific system A stored in an FMEA database DA. Field data is associated with certain effects using a wired or wireless connection C to system implementations, e.g., using event logging mechanisms. Multiple FMEAs may use the same data for parts and failure modes from the component database CD.

Because all elements of the meta-model described in the context of FIG. 2 use a unique identifier, the relations and associations of the elements may be used in a database system to avoid inconsistencies. If the number of failure modes of a part is to be increased, the new failure mode is incorporated (e.g., inserted) as a generic failure mode with an association to the corresponding generic part into the component database CD. Because all part instances refer to the unique identification number (ID) of a generic part, missing failure mode instances may be automatically inserted for every part instance in a specific FMEA analysis, such as the FMEA database DA. The roles R of the analysis, design, and/or engineering team may then be assured that all failure modes are listed for each part instance and that the model is consistent. Based on these consistent failure modes, effect elements are selected from the FMEA database DA for a specific system. In this way, an effect element may be used many times. On the one hand, an effect element may be used by associating the effect element with many failure mode instances. On the other hand, an effect element may be used for the analysis of several specific systems. A computer system LS may analyze automatically where the effect element is used in the analysis. The analysis also becomes more detailed because the failure rate may be calculated separately for every effect element. Using this consistent FMEA database DA with reused effect elements and consistent failure modes, failure effects measured for each implementation of the system A may be traced to the corresponding failure modes of involved parts. The tracing helps to identify components or electronic devices that exceed the assumed failure rates and that may be repaired or replaced to maintain the implementations of system A in the desired failure rate limitations of the analysis.

A processor of the computer system LS and/or another processor may be configured to implement the acts described herein.

The above-described method may be implemented via a computer program product including one or more computer-readable storage media having stored thereon instructions executable by one or more processors of a computing system. Execution of the instructions causes the computing system to perform operations corresponding with the acts of the method described above.

The invention has been described in detail with reference to embodiments thereof and examples. Variations and modifications may, however, be effected within the spirit and scope of the invention covered by the claims. The phrase "at least one of A, B and C" as an alternative expression may provide that one or more of A, B and C may be used.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for supporting failure mode and effects analysis, the method comprising:
storing a meta-model in a computer-readable storage medium, the meta-model comprising generic parts of a plurality of technical systems, generic failure modes, and associations between the generic parts and the generic failure modes, the associations indicating, for each generic part, one or more generic failure modes associated with the generic part, wherein each generic failure mode identifies a type of failure for a respective generic part;
instantiating, with a processor, the generic parts and the generic failure modes to generate part instances and failure mode instances, respectively, the part instances and the failure mode instances specifying an individual technical system of the plurality of technical systems;
storing the part instances and the failure mode instances in association with the plurality of technical systems; and
associating each failure mode instance with a respective one of the part instances based on the associations between the generic failure modes and the generic parts stored in the meta-model, wherein at least one of the part instances is associated with more than one failure mode instance.

2. The method of claim 1, wherein instantiating the generic parts and the generic failure modes comprises: constructing the part instances and the failure mode instances as objects from classes representing the generic parts and the generic failure modes; or
generating the part instances and the failure mode instances as database entries from database content specifying the generic parts and the generic failure modes.

3. The method of claim 1, further comprising:
quantifying a failure behavior for each part instance; and
storing a percentage in each failure mode instance, the percentage indicating a portion of the quantified failure behavior of the part instance associated with the failure mode instance that corresponds to the failure mode instance.

4. The method of claim 1, further comprising:
adding to the meta-model a new generic failure mode and an association of the new generic failure mode to a corresponding generic part; and
automatically instantiating, with the processor, the new generic failure mode to generate new failure mode instances and associations to all part instances previously instantiated from the corresponding generic part.

5. The method of claim 1, further comprising:
generating effect elements and associating each effect element with one or more failure mode instances of the individual technical system, wherein each effect element includes storing information about an effect of the associated failure mode instances on the individual technical system in each effect element.

6. The method of claim 5, further comprising:
storing in each effect element a safety categorization of the effect element.

7. The method of claim 5, further comprising:
logging events during operation of the individual technical system;
storing recorded effects based on the logged events;
associating each recorded effect with an effect element; and
monitoring, based on the frequency of the recorded effects, failure rates of the part instances, the failure mode instances, or both the part instances and the failure mode instances, associated with the effect element.

8. The method of claim 7, further comprising:
tracing recorded effects to the corresponding effect elements, the failure mode instances and the part instances; and
identifying the part instances that exceed a predetermined failure rate to repair or replace the identified part instances in order for the technical system to comply with failure rate limitations.

9. The method of claim 1, further comprising:
incorporating measure elements corresponding to diagnostic measures in the meta-model, wherein each diagnostic measure is configured to detect occurrence of the failure mode instances and to prevent failure effects caused by the failure mode instances;
associating each measure element with the failure mode instances the occurrence of which is detected; and
storing an effectiveness in each measure element, the effectiveness specifying a probability that the associated failure mode instances are detectable by the corresponding diagnostic measure.

10. The method of claim 1, wherein:
the generic parts are generic parts of electric vehicles, industrial plants, or both electric vehicles and industrial plants; and
at least one technical system of the plurality of technical systems is an electric vehicle, an industrial plant, a subsystem of an electric vehicle, or a subsystem of an industrial plant.

11. A system for supporting failure mode and effects analysis, the system comprising:
a digital data storage medium configured to store a meta-model, the meta-model comprising generic parts of a plurality of technical systems, generic failure modes, and associations between the generic parts and the generic failure modes, the associations indicating, for each generic part, one or more generic failure modes associated with the generic part, wherein each generic failure mode identifies a type of failure for a respective generic part; and
a processor configured to:
instantiate the generic parts and the generic failure modes to generate part instances and failure mode instances specifying an individual technical system of the plurality of technical systems;
store the part instances and the failure mode instances in association with the plurality of technical systems; and
associate each failure mode instance with a respective one of the part instances based on the associations between the generic failure modes and the generic parts stored in the meta-model, wherein at least one of the part instances is associated with more than one failure mode instance.

12. The system of claim 11, wherein the processor is further configured to instantiate the generic parts and the generic failure modes by:
constructing the part instances and the failure mode instances as objects from classes representing the generic parts and the generic failure modes; or
generating the part instances and the failure mode instances as database entries from database content specifying the generic parts and the generic failure modes.

13. The system of claim 11, wherein the processor is further configured to:
quantify a failure behavior for each part instance; and
store a percentage in each failure mode instance, the percentage indicating a portion of the quantified failure behavior of the part instance associated with the failure mode instance that corresponds to the failure mode instance.

14. The system of claim 11, wherein the processor is further configured to:
add to the meta-model a new generic failure mode and an association of the new generic failure mode to a corresponding generic part; and
automatically instantiate the new generic failure mode to generate new failure mode instances and associations to all part instances previously instantiated from the corresponding generic part.

15. The system of claim 11, wherein the processor is further configured to:
generate effect elements and associating each effect element with one or more failure mode instances of the individual technical system, wherein each effect element includes information about the effect of the associated failure mode instances on the individual technical system.

16. The system of claim 11, wherein the processor is further configured to:
store in each effect element a safety categorization of the effect element.

17. The system of claim 11, wherein the processor is further configured to:
log events during operation of the individual technical system;
store recorded effects based on the logged events; associate each recorded effect with an effect element; and
monitor, based on the frequency of the recorded effects, failure rates of the part instances, the failure mode instances, or both the part instances and the failure mode instances, that are associated with the effect element.

18. The system of claim 11, wherein the processor is further configured to:
  trace recorded effects to the corresponding effect elements, the failure mode instances and the part instances; and
  identify the part instances that exceed an predetermined failure rate to repair or replace the identified part instances in order for the technical system to comply with failure rate limitations.

19. The system of claim 11, wherein the processor is further configured to:
  incorporate measure elements corresponding to diagnostic measures in the meta-model, wherein each diagnostic measure is configured to detect occurrence of the failure mode instances and to prevent failure effects caused by the respective failure mode instances, associate each measure element with the failure mode instances the occurrence of which is detected; and
  store an effectiveness in each measure element, the effectiveness specifying a probability that the associated failure mode instances are detectable by the corresponding diagnostic measure.

20. The system of claim 11, wherein:
  the generic parts are generic parts of electric vehicles, industrial plants, or both electric vehicles and industrial plants; and
  at least one technical system of the plurality of technical systems is an electric vehicle, an industrial plant, a subsystem of an electric vehicle, or a subsystem of an industrial plant.

21. A computer program product including one or more non-transitory computer-readable storage media having stored thereon:
  a meta-model, the meta-model comprising generic parts of a plurality of technical systems, generic failure modes, and associations between the generic parts and the generic failure modes, the associations indicating, for each generic part, one or more generic failure modes associated with the generic part, wherein each generic failure mode identifies a type of failure for a respective a generic part; and
  instructions executable by one or more processors of a computing system, wherein execution of the instructions causes the computer system to perform operations for supporting failure mode and effects analysis, the instructions comprising:
    instantiating the generic parts and the generic failure modes to generate part instances and failure mode instances, respectively, the part instances and the failure mode instances specifying an individual technical system of the plurality of technical system;
    storing the part instances and the failure mode instances in association with the plurality of technical systems; and
    associate each failure mode instance with a respective one of the part instances based on the associations between the generic failure modes and the generic parts stored in the meta-model, wherein at least one of the part instances is associated with more than one failure mode instance.

* * * * *